(12) United States Patent
Kanamori

(10) Patent No.: US 6,614,342 B1
(45) Date of Patent: Sep. 2, 2003

(54) STRAIN GAUGE

(75) Inventor: Masaaki Kanamori, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/019,305

(22) PCT Filed: Jul. 10, 2000

(86) PCT No.: PCT/JP00/04601

§ 371 (c)(1),
(2), (4) Date: Jan. 8, 2002

(87) PCT Pub. No.: WO01/04594

PCT Pub. Date: Jan. 18, 2001

(30) Foreign Application Priority Data

Jul. 9, 1999 (JP) .............................. 11-196193

(51) Int. Cl.⁷ ................................................ G01L 1/22
(52) U.S. Cl. ........................ 338/2; 338/3; 338/5; 338/6; 338/8
(58) Field of Search .............................. 338/7, 8, 2, 3, 338/4, 5, 6

(56) References Cited

U.S. PATENT DOCUMENTS

| 3,750,270 | A | | 8/1973 | Ishii ............................ 29/580 |
| 3,775,839 | A | | 12/1973 | Talmo et al. .................. 29/595 |
| 4,104,607 | A | * | 8/1978 | Jones .......................... 338/309 |
| 4,454,495 | A | * | 6/1984 | Werner et al. .............. 338/195 |
| 4,462,018 | A | * | 7/1984 | Yang et al. ............. 12/142 RS |
| 5,039,976 | A | * | 8/1991 | Drabkin ...................... 338/314 |
| 5,508,676 | A | * | 4/1996 | Grange et al. ................. 338/2 |
| 5,549,006 | A | | 8/1996 | Kurtz .......................... 73/708 |
| 6,097,276 | A | * | 8/2000 | Van Den Broek et al. ...... 338/9 |

FOREIGN PATENT DOCUMENTS

| JP | 59-75104 | | 4/1984 | |
| JP | 0103194 | * | 9/1987 | ..................... 338/9 |
| JP | 3-173101 | * | 7/1991 | ..................... 338/7 |
| JP | 6-347345 | | 12/1994 | |

* cited by examiner

Primary Examiner—Karl D. Easthom
(74) Attorney, Agent, or Firm—Jacobson Holman PLLC

(57) ABSTRACT

A high-performance strain gauge has a high gauge factor and a decreased temperature coefficient of resistance (TCR). The strain gauge has a laminated structure that includes a first layer formed of a positive TCR material and a second layer formed of a negative TCR material.

3 Claims, 2 Drawing Sheets

STRAIN GAUGE

This is a nationalization of PCT/JP00/04601 filed Jul. 10, 2000 and published in Japanese.

TECHNICAL FIELD

The present invention relates to a strain gauge to be used, for example, in a pressure sensor or a load cell.

BACKGROUND ART

Conventionally, a thin film strain gauge has been used in an automotive pressure sensor, a pressure sensor for measuring pressure, or load, a load cell and the like.

That is, a thin film strain gauge film is formed on an insulating film directly provided on the metal diaphragm of a pressure sensor or the beam member of a load cell and is used for pressure measurement, etc.

A case in which a strain gauge is used in a pressure sensor will be described with reference to FIGS. 3 and 4.

FIG. 3 is a schematic diagram illustrating a main portion of a pressure sensor, and FIG. 4 is a circuit diagram of the pressure sensor shown in FIG. 3.

As shown in FIG. 3, when using a strain gauge in a pressure sensor, a gauge pattern consisting of four gauge films (12, 13, 14, and 15) is formed, for example, on a metal diaphragm 5 through the intermediation of an insulating film by photolithography process or the like.

And, FIG. 4 is a circuit diagram of the pattern.

Due to the above-described construction, any change in the pressure (stress) on the diaphragm 5 results in the diaphragm 5 being deformed accordingly.

Thus, deformation of the diaphragm 5 results in a change in the strain,amounts of the respective gauge films 12, 13, 14, and 15 formed on the diaphragm 5.

As shown in FIG. 3, the stress coefficient on the diaphragm 5 varies according to the position, so that the strain amounts of the respective gauge films 12, 13, 14, and 15 are not the same. When the strain amounts of the respective gauge films 12, 13, 14, and 15 are thus changed in response to a change in pressure, the electrical resistances of the respective gauge films 12, 13, 14, and 15 are also changed.

Thus, the resistance values $R_1$, $R_2$, $R_3$, and $R_4$ shown in FIG. 4 change in accordance with the pressure, so that the output voltage V1 with respect to the input voltage V0 changes. Since the output voltage V1 changes linearly according to the pressure change, it is possible to measure the pressure from the output voltage V1.

However, the above-described prior art technique involves the following problems.

The main characteristics required of the material for the gauge film in achieving an improvement in the performance and characteristics of such a pressure sensor or the like are as follows: (1) small temperature coefficient of resistance (hereinafter referred to as TCR), (2) high gauge factor, (3) high resistivity, (4) small change in resistance with time, (5) independence of the gauge factor of temperature, etc.

In view of this, a metal strain gauge, for example, of an NiCr type metal, has been put into practical use. However, as a result of the improvement in the various performances of vehicles and other apparatuses in which the pressure sensor or the like is used, there increases a demand for an improvement in the performance and characteristics of various parts and sensors, and it is difficult for the conventionally used materials to meet such a demand.

For example, when used as the gauge material, silicon semiconductor, which has a high gauge factor of approximately several tens, exhibits high sensitivity with respect to pressure change, thus proving an effective material. However, its TCR is rather large, and its linearity is deficient, so that, for precise measurement, it is necessary to provide a special device for temperature compensation.

When used as the gauge material, a metal material consisting, for example, of an NiCr type alloy or a CuNi type alloy, has a small TCR (several to several hundred ppm/K). On the other hand, it has a rather low gauge factor of approximately 2, which leads to low sensitivity to pressure change.

As a gauge material having a high gauge factor, a Cr type material (with a gauge factor of approximately 10) is being studied. However, due to its poor output temperature characteristics (TCR, etc.), it has not been put into practical use yet.

In this way, selection of a material with a small TCR involves a low gauge factor. On the other hand, selection of a material with a high gauge factor involves a large TCR. Thus, conventionally, it has been impossible to simultaneously achieve a high gauge factor and a small TCR.

From this point of view, there has been also proposed a metal thin film strain gauge in which a resistor consisting of an Fe—Cr—Al alloy thin film is formed into a film by evaporation, sputtering or the like as the resistor of a metal thin film strain gauge (See, for example, Japanese Patent Application Laid-open No. Hei 6-137804).

However, even in this strain gauge, the gauge factor is still rather low. Thus, there has been a demand for a strain gauge having a high gauge factor and a decreased temperature coefficient of resistance.

The present invention has been made with a view toward solving the above problem in the conventional art. It is an object of the present invention to provide a strain gauge having a high gauge factor and a decreased temperature coefficient of resistance (TCR) to thereby achieve an improvement in terms of performance.

DISCLOSURE OF THE INVENTION

To achieve the above object, in accordance with the present invention, a strain gauge is characterized by comprising a laminated structure that includes a first layer formed of a positive TCR material and a second layer formed of a negative TCR material.

Thus, even if, to achieve an increase in the gauge factor of the strain gauge as a whole, materials having a high gauge factor are selected as the materials for forming the first and second layers, it is possible to reduce the temperature coefficient of resistance of the strain gauge as a whole since the materials have positive and negative temperature coefficients of resistance, respectively. Further, due to the laminated structure, each layer provides an interface effect to thereby further increase the gauge factor. The first layer is preferably formed of a crystalline metal material, and the second layer is preferably formed of an amorphous metal. The second layer is preferably formed of tantalum.

BEST MODE FOR CARRYING OUT THE INVENTION

Preferred embodiments and examples of this invention will now be described in detail by way of an example with reference to the drawings. It is to be noted that the dimensions, materials, configuration, positional relationship, etc. of the components given in the embodiments and examples should not be construed restrictively limiting the scope of this invention thereto unless otherwise specified.

Figure 3:
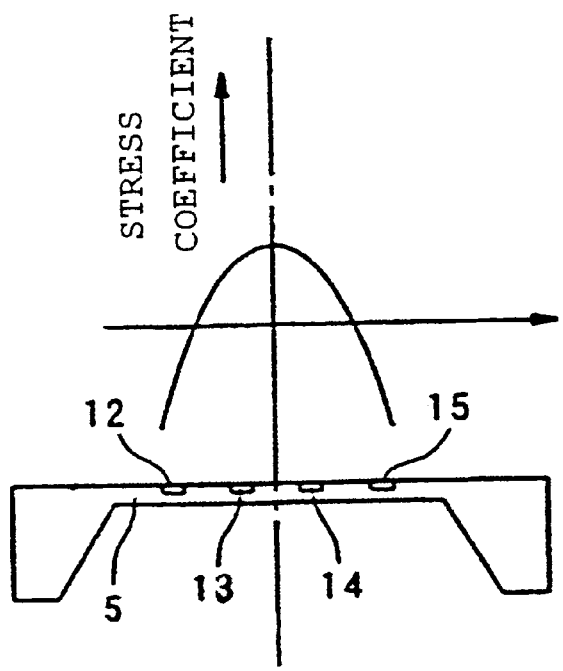
FIG. 3 is a schematic explanatory diagram schematically showing a main portion of a pressure sensor.
Figure 4:
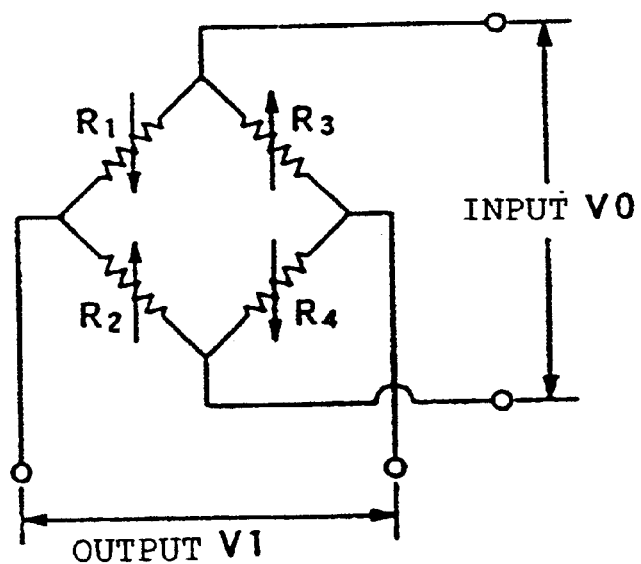
FIG. 4 is a circuit diagram of the pressure sensor shown in FIG. 3.

Further, the strain gauge in accordance with the embodiment of the present invention is applicable to various well-known sensors, etc. apart from a pressure sensor which is explained in the above conventional art referring to FIGS. 3 and 4. However, since such sensors belong to a well-known technique, a description thereof will be omitted.

Embodiments

Strain gauges in accordance with embodiments of the present invention will be described with reference to FIGS. 1 and 2.

Figure 1:
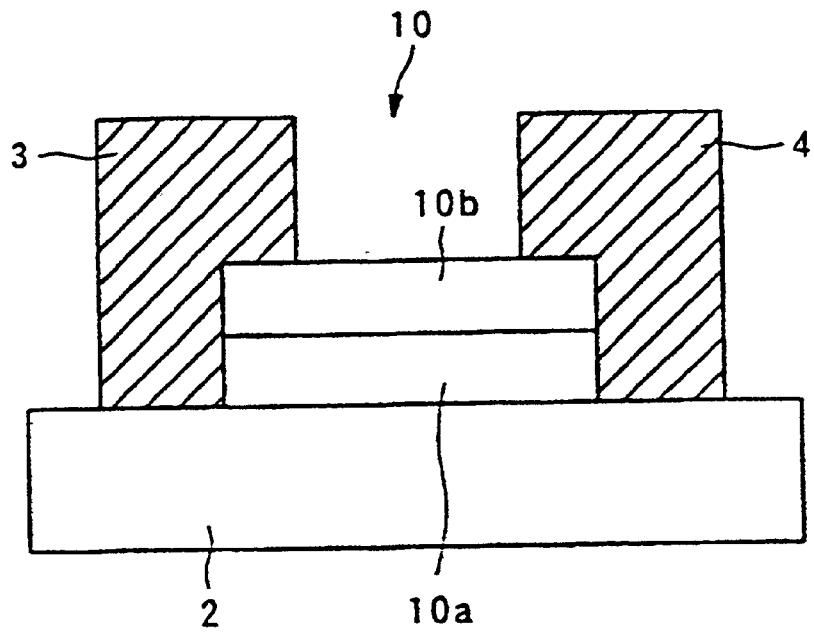
FIG. 1 is a schematic sectional view of a strain gauge in accordance wits an embodiment of the present invention (which has a two-layered structure)
Figure 2:
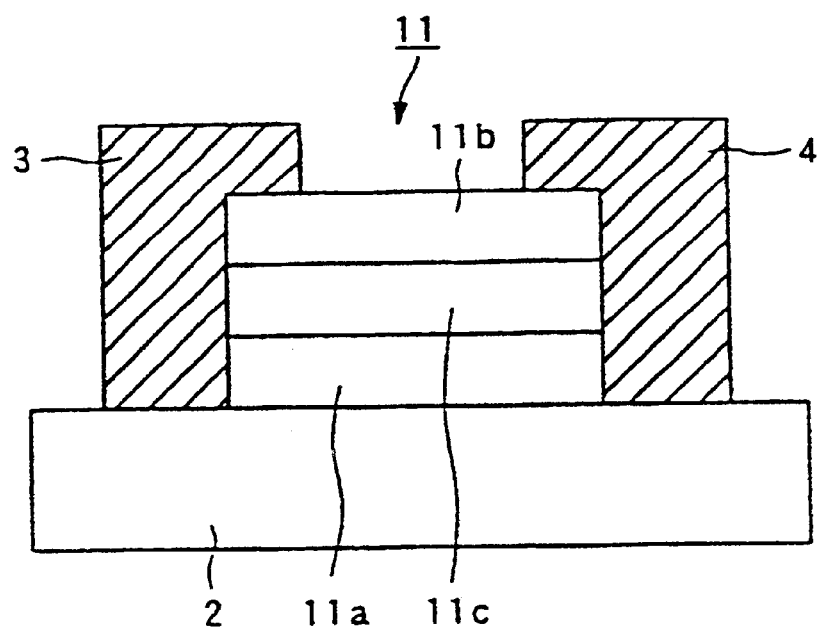
FIG. 2 is a schematic sectional view of a strain gauge in accordance with an embodiment of the present invention (which has a three-layered structure.

FIGS. 1 and 2 are schematic sectional views showing strain gauges in accordance with embodiments of the present invention. FIG. 1 shows a two-layered structure, and FIG. 2 shows a three-layered structure.

First, the strain gauge shown in FIG. 1 will be described.

As shown in the drawing, a strain gauge 10 is formed on a substrate 2, and situated between a pair of electrodes 3 and 4.

The strain gauge 10 has a laminated structure which is composed of a first layer 10a formed of a positive TCR material and a second layer 10b formed of a negative TCR material.

This laminated structure provides an interface effect between the respective layers, so that an increase in gauge factor can be expected.

Further, in this embodiment, a positive TCR material and a negative TCR material are stacked together, so that, even if a material having a high gauge factor is selected for each layer, it is possible to decrease the TCR of the strain gauge as a whole.

That is, when a material having a high gauge factor is selected as the material for the first layer 10a, the TCR of the first layer 10a is positively large.

In this case, a material which has an appropriate gauge factor and whose TCR is negatively large is selected as the material for the second layer 10b.

By combining and stacking together the first layer 10a and the second layer 10b, it is possible to reduce the TCR of the strain gauge 10 as a whole.

Thus, the strain gauge 10 as a whole allows reduction in TCR while increasing the gauge factor, and is superior in sensitivity and temperature dependency. Therefore, when applied to various sensors, etc., it makes it possible to achieve an improvement in the performance of such sensors or the like.

Further, the respective temperature coefficients of resistance of the first and second layers 10a and 10b shown in FIG. 1 will be referred to as TCR1 and TCR2. Assuming that the first layer 10a and the second layer 10b are connected in parallel, the TCR of the strain gauge 10 as a whole can be expressed by the following Equation 1:

$$TCR = \left\{ 1 - \frac{\alpha\beta(R1 + R2)}{\alpha R1 + \beta R2} \right\} \cdot \frac{1}{\Delta T}$$

where R1 and R2 are the respective electrical resistances of the first and second layers 10a and 10b between the electrodes 3 and 4 at a temperature T; R1' and R2' are the respective electrical resistances of the first and second layers 10a and 10b between the electrodes 3 and 4 at a temperature T'; $\Delta T$ is the temperature difference ($\Delta T = T - T'$); $\alpha = R2'/R1'$; and $\beta = R2'/R2$.

When appropriate materials are selected, this equation makes it possible to control the TCR value.

Next, the strain gauge shown in FIG. 2 will be described.

While the strain gauge shown in FIG. 1 has a two-layered structure, the strain gauge 11 shown in FIG. 2 has a three-layered structure.

The strain gauge 11 is composed of a first layer 11a formed of a positive TCR material, a second layer 11b formed of a negative TCR material and an intermediate layer 11c.

That is, this strain gauge 11 is constructed so as to have the intermediate layer 11c as compared to the strain gauge shown in abovementioned FIG. 1. The other construction, etc. are the same, so that a description thereof will be omitted.

The intermediate layer 11c is provided for the purpose of preventing mutual diffusion of the components of the respective materials of the first and second layers 11a and 11b, which can occur when, for example, forming the first and second layers depending upon the materials for these layers. The intermediate layer is preferably formed, for example, of tungsten.

The above-described construction can also provide the same effect as that shown in FIG. 1.

The temperature coefficient of resistance of the material for the intermediate layer 11c will be referred to as TCR3. The TCR of the strain gauge 11 as a whole can be expressed by the following Equation 2:

$$TCR = \left\{ 1 - \frac{\alpha\beta\gamma(R1R2 + R2R3 + R1R3)}{\alpha\beta R1R2 + \beta\gamma R2R3 + \alpha\gamma R1R3} \right\} \cdot \frac{1}{\Delta T}$$

where R3 is the electrical resistance of the intermediate layer 11c between the electrodes 3 and 4 at the temperature T; R3' is the electrical resistance of the intermediate layer 11c between the electrodes 3 and 4 at the temperature T'; and $\gamma = R3'/R3$. As to the other symbols regarding the first and second layers 11a and 11b, they are the same as those used in Equation 1.

When appropriate materials are selected, this equation makes it possible to control the TCR value.

Note that, while in the above-described explanation laminated structures having two or three layers cases are adopted as examples, it goes without saying that the same effect can be also obtained by adopting an appropriate multi-layer structure having more layers.

Examples of the positive TCR material include a general crystalline metal (chromium (Cr)), and examples of the negative TCR material include an amorphous metal (e.g., ZrCu).

Specific examples in which appropriate materials are selected according to the above embodiments will now be described.

EXAMPLE 1

A case will be described in which the material for the first layer formed of a positive TCR material is chromium (Cr), in which the material for the second layer formed of a negative TCR material is an alloy of zirconium and copper ($Zr_{61}Cu_{39}$ at %, hereinafter referred to as ZrCu) constituting an amorphous alloy, and in which the material for the intermediate layer 11c used as a diffusion barriers material is a tungsten (W) which is a positive TCR material.

First, thin films of ZrCu, W, and Cr are formed in that order on a glass substrate by sputtering.

Thereafter, an Au/W electrode is formed by sputtering, and heat treatment is conducted at 300° C. for four hours in the atmospheric environment.

Here, the thickness of the ZrCu film is 300 nm, that of the W film is 25 nm, and that of the Cr film is 10 nm.

The TCR and gauge factor of the laminated film (strain gauge) thus formed were measured.

The TCR was calculated from resistance measurement results obtained by a digital multi-meter in the range of −45 to 131° C., and the gauge factor was obtained from the rate of change in resistance when strain was imparted by four-point bending.

Further, for comparison, the respective TCRs and gauge factors of the component materials of the laminated film were measured.

Furthermore, for comparison, the TCR and gauge factor of a structure obtained by forming a thin film (film thickness: 300 nm) of $Ni_{78}Cr_{22}$ at % (=$Ni_{80}Cr_{20}$ wt %) on a glass substrate by sputtering were also measured.

Table 1 shows the measurement results thereof.

TABLE 1

| Lamination state (film thickness [nm]) | TCR [ppm/K] | Gauge factor |
|---|---|---|
| Cr (10) -W (25) -ZrCu (300) -G | +48.6 | 3.12 |
| Cr | +755 | 12.6 |
| W | +859 | 3.15 |
| ZrCu | −130 | 2.84 |
| $Ni_{78}Cr_{22}$ at % | +111 | 2.19 |

Symbol G indicates the glass substrate.

As can be seen from Table 1, it was possible to increase the gauge factor and to decrease the temperature coefficient of resistance (TCR), making it possible to achieve an improvement in terms of performance.

EXAMPLE 2

A case will be described in which the first layer formed of a positive TCR material consists of a multi-layer film of chromium (Cr) and tungsten (W), and in which the second layer formed of a negative TCR material consists of tantalum (Ta).

First, a multi-layer film consisting of Cr and W layers alternately stacked together (in which five Cr layers and four W layers are alternately stacked to constitute the first layer) is formed on a glass substrate by sputtering. Next, a Ta thin film is formed thereon into a thickness of 154 nm.

Using Equation 1 for obtaining TCR, the thickness of each layer was set such that TCR was approximately 40 ppm/K.

Thereafter, an Au/W electrode was formed by sputtering, and heat treatment was conducted in the atmospheric environment at 300° C. for four hours.

The TCR and gauge factor of the laminated film (strain gauge) thus formed were measured.

The measurement method, etc. were the same as those in Example 1. Further, as in Example 1, the respective TCRs and gauge factors of the component materials of the laminated films were also measured.

Table 2 shows the measurement results thereof.

TABLE 2

| Lamination state (film thickness [nm]) | TCR [ppm/K] | Gauge factor |
|---|---|---|
| Ta (154) - [Cr(4.0) -W(4.0) . . . ]$_4$-Cr (4.0) -G | +94.5 | 4.11 |
| Ta | −189 | 2.79 |
| Cr | +875 | 12.6 |
| W | +859 | 3.15 |
| $Ni_{78}Cr_{22}$ at % | +111 | 2.19 |

Symbol G indicates the glass substrate.

As can be seen from Table 2, it was possible to increase the gauge factor and to decrease the temperature coefficient of resistance (TCR), thus achieving an improvement in terms of performance.

As described above, in accordance with the present invention, a strain gauge has a laminated structure that includes a first layer formed of a positive TCR material and a second layer formed of a negative TCR material, whereby it is possible to increase the gauge factor and to decrease the temperature coefficient of resistance, thus achieving an improvement in performance.

The first layer is preferably formed of a crystalline metal material, and the second layer is preferably formed of an amorphous metal or tantalum.

INDUSTRIAL APPLICABILITY

As described above, the strain gauge of the present invention is suitable for use in an automotive pressure sensor, a pressure sensor for measuring pressure and load, a load cell, etc.

What is claimed is:

1. A strain gauge having a laminated structure comprising a first layer formed of a multi-layer film consisting of chromium and tungsten, and a second layer formed of a material whose temperature coefficient of resistance is negative.

2. A strain gauge according to claim 1, wherein said second layer is formed of an amorphous metal.

3. A strain gauge according to claim 1, wherein said second layer is formed of tantalum.

* * * * *